3,166,538
COPOLYMERIZATION PROCESS
Setha G. Olson, Moorestown, N.J., and Harold M. Spurlin, Wilmington, Del., assignors to Hercules Powder Company, Wilmington, Del., a corporation of Delaware
No Drawing. Filed Jan. 13, 1961, Ser. No. 82,386
12 Claims. (Cl. 260—88.2)

This invention relates to a process of preparing a copolymer of ethylene and a higher 1-olefin that is essentially homogeneous as to its composition.

It is now well known that olefins may be polymerized at relatively low temperatures and pressures by means of the so-called Ziegler catalyst, i.e. a transition metal compounds used in combination with a metal alkyl. It is also known that mixtures of olefins may be copolymerized by this process. However, in the preparation of such copolymers, the olefins, having different polymerization rates, one monomer then enters into the copolymerization reaction faster than the other with the result that the copolymer that is produced is not homogeneous. Such a copolymer varies not only as to the composition of the copolymer but as to the molecular weight distribution. Hence, only a small fraction of the total polymer may be one that has useful properties, and more than likely, even that small fraction will not have optimum properties for certain applications. Such is the case when ethylene and propylene are copolymerized by the so-called Ziegler process or modifications thereof. Ethylene enters into the polymer much faster than does propylene and it has previously been impossible to produce an ethylene-propylene copolymer of uniform composition and narrow molecular weight distribution. While it has been possible to produce a copolymer essentially free of homopolymers, the product was still heterogeneous, that is, it was a mixture of copolymers varying widely in their ethylene and propylene contents. Only by tedious fractionation procedures has it been possible to isolate fractions somewhat more homogeneous in character, but even these fractions leave much to be desired. Obviously, such a product and such a process is not desirable for the commercial production of these copolymers as, for example, copolymers for use as a rubber substitute in tires.

Now in accordance with this invention it has been found that ethylene may be copolymerized with a second olefin by a process that yields an outstandingly superior copolymer and, at the same time, by a process wherein the total polymeric product is essentially homogeneous as to its composition.

In the process of this invention ethylene and a second olefin, as for example, propylene, are copolymerized in a homogeneous liquid phase reaction mixture by passing ethylene and, the second olefin as, for example, propylene, into an inert liquid organic solvent having dissolved therein the copolymerization catalyst, at such a rate that the ratio of ethylene to propylene in the reaction mixture is kept constant throughout the polymerization reaction, the inert organic liquid diluent being one that is a solvent for each of the olefin monomers, the catalyst used for the copolymerization, and the copolymer that is produced, wherein the catalyst used for the copolymerization reaction is that formed by mixing in situ a diorganoaluminum halide with a vanadium oxy trihalide. By carrying out the process in this manner it has been discovered that not only essentially all of the copolymer so produced is homogeneous as to its composition, but it also has a narrow molecular weight distribution, and copolymers so produced and containing from about 25 to about 60 mole percent of propylene have exceptional elastometric properties which enable their use as a replacement for rubber.

One of the criteria in carrying out the copolymerization process and producing a homogeneous product of uniform composition and narrow molecular weight distribution is the catalyst that is used for the copolymerization reaction. It must be completely in solution in the reaction mixture. It has been found that the catalyst formed by reacting a diorganoaluminum halide with a vanadium oxy trihalide is unique in that the copolymer produced in the process of this invention is homogeneous if the catalyst is produced in situ in the polymerization reaction mixture. If, instead of forming the catalyst in situ, the same catalyst ingredients are used but they are mixed prior to introduction into the polymerization reaction mixture, the copolymer product is heterogeneous as to its composition and has a very wide molecular weight distribution. This is true even if the final reaction mixture appears to be homogeneous. The use of a premixed catalyst tends to result in lumps of gel forming around the catalyst. When such gels arise, there will be an impoverishment of ethylene in the interior of the gel due to the high reactivity of ethylene coupled with the low concentration of ethylene in solution. To react the catalyst ingredients in situ, solutions of each of the catalyst ingredients in an inert organic solvent, which may be the same as the solvent used for the copolymerization reaction or one that is miscible therewith, are separately added either continuously or in increments throughout the polymerization reaction. If a copolymer having both homogeneity as to its composition and also narrow molecular weight distribution is desired, continuous addition of both catalyst ingredients is preferred. While incremental addition of both catalyst ingredients is an approximation of continuous addition, particularly if the interval between increments is relatively short, the molecular weight distribution is broader, and the longer the time interval between increments, the broader the molecular weight distribution of the final product. However, whether continuous or incremental addition of the catalyst ingredients is used, the copolymer product still is essentially homogeneous as to its composition. It is also possible to carry out the copolymerization reaction of this invention by adding the aluminum compound initially and adding the vanadium compound continuously or incrementally. Even so, the molecular weight distribution will be broader than if both catalyst ingredients were added continuously. However, as before, the copolymer composition will be homogeneous. Regardless of the method by which the catalyst is formed in situ, the amount of catalyst formed at any one time in the reaction mixture must be such that it will remain in solution in the polymerization mixture. In general, the amount of catalyst added is such as will maintain a reasonable rate of copolymerization under the reaction conditions, that is, the type of copolymerization process, monomers being copolymerized, temperature, pressure, etc. It has been found that in the catalyst system used in this invention, the rate of loss of catalytic activity is very high if the catalyst concentration is high in the presence of the olefin monomers. The rate of catalyst decay can be, in fact, proportional to the square of the catalyst concentration. Accordingly, a great advantage in the yield of polymer per unit of catalyst consumed is derived if the catalyst is always added in such a fashion as to maintain a stationary but low concentration. The particular catalyst concentration at which the process is preferably maintained will depend on the temperature and pressure at which the polymerization is carried out, the monomers being copolymerized, etc. Thus, for example, the higher the temperature the lower the stationary active catalyst concentration that should be maintained for optimum results. In general, the rate of addition of the catalyst will preferably be at or below about 2 millimoles of vanadium per liter per hour. The ratio of aluminum compound to vanadium compound may be varied considerably but for high molecular weight copolymers generally will be from about 1 to about 10 and preferably from about 3 to about 8. However, if a polymer of more moderate molecular weight is desired, higher ratios of aluminum compound to vanadium compound can be used as, for example, a ratio of about 10 to about 30. In some cases additional aluminum compound may be added during the copolymerization reaction. It is also frequently desirable to add a small amount of aluminum compound initially in order to remove polar impurities in the reaction mixture which may be present in the solvent, etc. Hence, it is possible to use a ratio of aluminum compound to vanadium compound up to as high as 500 or more, depending upon the conditions of the reaction, the molecular weight of polymer that is desired, etc.

Any diorganoaluminum halide, i.e. a compound having the general formula $R_2AlX$, where R is a hydrocarbon radical and the R's may be the same or different hydrocarbon radicals and X is halogen, may be used as the aluminum compound in this catalyst system. Thus, the hydrocarbon group may be alkyl, cycloalkyl, aryl or alkaryl, as for example, methyl, ethyl, propyl, isopropyl, n-butyl, isobutyl, tert-butyl, amyl, isoamyl, hexyl, isohexyl, octyl, 2-ethyl-hexyl, cyclohexyl, phenyl, benzyl, etc., and the halogen may be chlorine, bromine or iodine. Mixtures of the dihydrocarbon-aluminum halide with other hydrocarbon aluminum compounds may be used, as for example, the aluminum alkyl sesquihalides such as the ethylaluminum sesquichlorides, etc. Exemplary of the vanadium oxy trihalides that may be used are vanadium oxy trichloride, vanadium oxy tribromide, vanadium oxy triiodide, etc.

The copolymerization process of this invention is carried out in an inert liquid organic diluent which is a solvent for the polymerization system. As pointed out above, to obtain a copolymer product of homogeneous composition throughout the polymerization reaction, the diluent should be one that is a solvent not only for the monomers being copolymerized but also for the copolymer that is produced. In addition, it should also be a solvent for the catalyst so that the entire copolymerization reaction mixture is homogeneous throughout the copolymerization process. Suitable diluents for the copolymerization are, in general, the hydrocarbon solvents, i.e. aromatic, alicyclic and aliphatic hydrocarbons and chlorinated aromatic, alicyclic and aliphatic hydrocarbons and mixtures thereof. Exemplary of such diluents that may be used are hexane, heptane, octane, nonane, decane, benzene, toluene, xylene, cyclohexane, methylcyclohexane, carbon tetrachloride, methylene chloride, tetrachloroethylene, chlorobenzene, dichlorobenzene, etc.

The copolymerization reaction may be carried out over a wide range of temperature and pressure conditions and as a batch or continuous operation. In general, as the temperature of the reaction increases, the catalyst mileage and the molecular weight of the copolymer decrease. Any temperature within the range of from about 0° C. to about 150° C., preferably from about 0° C. to about 125° C., and more preferably from about 25° C. to about 80° C. may be used. Copolymers of high molecular weight containing anywhere from 30 to 99 mole percent of propylene may be prepared at the lower temperatures, as for example, 25° C. to 35° C., but to prepare copolymers containing less than about 30 mole percent of propylene it is generally necessary to use increasingly higher temperatures in order to maintain a homogeneous reaction mixture. In general, the reaction will be carried out at or about atmospheric pressure, but may be carried out anywhere from 1 to 30 atmospheres pressure or higher, as for example, up to about 100 atmospheres if desired.

By carrying out the copolymerization reaction in accordance with this invention it is possible to prepare a copolymer of any desired composition of from 0.5 to 99.5 mole percent of ethylene and 99.5 to 0.5 mole percent of the second olefin. For use as a synthetic rubber, an ethylene-propylene copolymer will generally preferably contain from about 25 mole percent to about 60 mole percent of propylene, copolymers having less mole percent of propylene than this range being more plastomeric than elastomeric and products having a higher mole percent of propylene being more difficult to cure and having poorer low temperature properties. It is likewise possible to prepare copolymers of any desired molecular weight up to an RSV of at least about 12, again depending somewhat upon the composition of the copolymer, the temperature of the reaction, the Al/V ratio, pressure, and the presence of deliberately added ingredients such as hydrogen.

In accordance with this invention any linear 1-olefin may be copolymerized with ethylene to produce a homogeneous copolymer, particularly outstanding results being obtained in the case of ethylene-propylene copolymerization and ethylene-(1-butene) copolymerization.

A further advantage of the process of this invention is that ethylene may be copolymerized with a second olefin to produce a copolymer of any desired composition by saturating the liquid reaction mixture with a given monomer concentration and maintaining the saturation at this level throughout the copolymerization reaction. During the copolymerization the ratio of ethylene to the second olefin in the gas phase is very different from that in the liquid phase since the second olefin is more soluble than ethylene, and ethylene is more reactive than the second olefin, so that the two monomers do not enter the polymer in the ratio of their concentration in solution. In carrying out the process of this invention and obtain thereby a homogeneous copolymer it is necessary to saturate the diluent initially with a mixture of monomers containing a given mole percent of propylene and then keep the composition of the gas in equilibrium with the liquid constant at that value throughout the copolymerization reaction. This may be readily done by monitoring the composition of the off-gas from the reaction and maintaining the composition at the desired level by adjusting the ratio of the ethylene and propylene in the inlet streams.

The composition of the copolymer being formed at any one moment is given by the copolymerization equation $$\frac{m_2}{m_3} = \frac{M_2}{M_3}\left(\frac{r_2 M_2 + M_3}{r_3 M_3 + M_2}\right)$$

where $M_2$ and $M_3$ are mole fractions of ethylene and the second olefin, respectively, in the gas phase in equilibrium with the solution, $m_2$ and $m_3$ are mole fractions of ethylene and the second olefin in the copolymer being formed, and $r_2$ and $r_3$ are the reactivity ratios for ethylene and the second olefin, respectively. Using the process in accordance with this invention and the catalyst obtained by mixing a dialkylaluminum halide and vanadium oxy trichloride in situ, it has been found that for ethylene-propylene copolymerizations at or near room temperature, $r_2$ equals approximately 5 and $r_3$ equals approximately $\frac{1}{5}$. Using these $r_2$ and $r_3$ values and inserting the mole fraction of ethylene and propylene desired in the copolymer, it is then possible to calculate what monomer composition should be maintained in the gas phase in equilibrium with the solution and so produce the desired copolymer. It should be noted that if $r_2$ and $r_3$ were based on concentrations in solution, and with chlorobenzene as the diluent, the values would be $r_2=26$ and $r_3=0.04$, due to the 5.2-fold greater solubility of propylene in chlorobenzene.

The following examples will illustrate the process of copolymerizing ethylene with a second olefin in accordance with this invention using as the catalyst a mixture of a vanadium oxy trihalide with a diorganoaluminum halide. All parts and percentages are by weight unless otherwise indicated. The molecular weight of the copolymer is indicated by the citation of the reduced specific viscosity (RSV) of the copolymer as measured in decalin.

at 135° C. By the term "reduced specific viscosity" is meant the ηsp/c determined on an 0.1% solution of the polymer in decalin, containing 0.1 g. of the polymer per 100 ml. of solution, at 135° C.

EXAMPLE 1

In this example ethylene and propylene were copolymerized in a one-liter flow reactor with the catalyst formed in situ. The apparatus was alternately evacuated and flushed with nitrogen three times, 500 milliliters of the diluent, chlorobenzene, was added under nitrogen, and the apparatus was again alternately evacuated and flushed with nitrogen three more times and the temperature of the reactor was adjusted to 30° C. Streams of ethylene and propylene were metered through a calibrated rotameter, mixed, and introduced into the reactor below the liquid level. The diluent was saturated at the rate of 1 liter/min. with a mixture of the ethylene and propylene containing 68 mole percent of propylene. An additional rotameter was used to record the volume of the off-gas. When the inlet and off-gas rotameter readings were identical, indicating that saturation was complete, the volume of the input mixture was reduced to 250 ml./min., and the off-gas was passed through a thermal conductivity cell so that its composition could be monitored and kept constant at 68 mole percent of propylene throughout the copolymerization run. At this point, there was added to the saturated diluent, by syringe, an amount of diethylaluminum chloride equal to 1.2 millimoles/liter in order to remove any impurities, such as water, from the diluent so that the copolymerization would begin immediately upon addition of the catalyst. The two catalyst ingredients, diethylaluminum chloride and vanadium oxy trichloride, were added as 0.025 M and 0.02 M solutions in n-heptane, respectively. These solutions were pumped into the mixture separately and continuously with individual microbellows pumps at the rate of 0.5 ml./min. As soon as the copolymerization reaction started, there was an immediate drop in the value of the off-gas rotameter reading. At this point both the volume and the composition of the input gas mixture were adjusted so that the off-gas volume remained at 250 ml./min. and the off-gas composition remained at the saturation composition. Thus, the volume of the total input mixture was increased or decreased as the off-gas volume decreased or increased respectively. In the same way, if the off-gas composition increased in, for example, ethylene, then less ethylene was used in the input gas mixture until the galvanometer reading returned to its original value. Generally speaking, adjustments were only required during about the first 15 minutes of the reaction, a steady state having been reached by that time; and only very slight further manipulation of the controls was required to maintain the off-gas composition constant. The copolymerization was run until the homogeneous reaction mixture became very viscous (40 min.), and it was difficult to control the off-gas composition because of the change in the rate of solution of ethylene in the viscous mixture. The total amount of diethylaluminum chloride added by pump was 0.8 millimole/l. and the amount of vanadium oxy trichloride added was 0.42 millimole/l. The total final aluminum to vanadium ratio was 4.8.

The copolymerization reaction mixture was quenched by adding 10 milliliters of n-butanol and then was diluted with 100–200 milliliters of heptane. The reaction mixture was then washed with 200 milliliters of 10% aqueous hydrochloric acid, the organic layer was separated and successively washed with water until the aqueous phase was neutral. The soluble copolymer was then isolated by pouring the organic layer into 3 times its volume of acetone. The rubbery mass so obtained was separated from the acetone, cut into small pieces and dried for 16 hours under vacuum at 40° C. It amounted to a yield of 33 g./l./hr. and had an RSV of 3.8 and contained 35.5 mole percent of propylene, as determined by infrared analysis, the remainder of the copolymer being ethylene.

EXAMPLE 2

Ethylene and propylene were copolymerized in a one-liter flow reactor with the catalyst formed in situ following the same general procedure described in Example 1 except that the diethylaluminum chloride was added at the start of the reaction and the vanadium oxy trichloride was added in increments at 5-minute intervals throughout the copolymerization reaction. In this case the diluent was saturated at the rate of 1 liter/min. with a mixture of ethylene and propylene containing 70 mole percent of propylene. When the saturation was completed, the volume of the input mixture was reduced to 680 ml./min. and the composition of the ethylene-propylene input gas was changed to one containing 50 mole percent of propylene and adjusted as necessary so that the propylene:ethylene ratio in the off-gas remained constant. The amount of diethylaluminum chloride added was 10 mmole/l. and the total amount of vanadium oxy trichloride added during the polymerization was 0.8 mmole/l.

The copolymerization reaction was stopped after 42 minutes and the copolymer was isolated as described in Example 1. There was no insoluble polymer formed, the polymerization reaction mixture being completely homogeneous throughout the run. There was obtained a yield equal to 62 g./l./hr. and the copolymer had an RSV of 2.4 and contained 39 mole percent of propylene as determined by infrared analysis. This copolymer when vulcanized, using a peroxide cure, exhibited excellent tensile strength, modulus and elongation.

EXAMPLES 3–6

Ethylene and propylene were copolymerized in a one-liter flow reactor with the catalyst formed in situ following the general procedure described in Example 1. The diluent used in each of these examples was a commercial heptane which was chiefly a mixture of paraffin and naphthenic hydrocarbons and had a boiling range of 94–99° C. In examples 3–5 the aluminum compound was diethylaluminum chloride, and in Example 6 ethylaluminum sesquichloride was used.

In Table I is set forth the amount of aluminum compound and vanadium oxy trichloride used in each of these examples expressed as millimoles per liter, the ratio of aluminum compound to vanadium compound, the reaction time, the amount of copolymer produced expressed as grams per liter per hour and as grams per millimole of vanadium, its RSV and the mole percent of propylene, as determined by infrared analysis, the remainder of the copolymer being ethylene. In each example the reaction was completely homogeneous.

*Table I*

| Example | Aluminum Compound | Mmole/l. | VOCl₃, mmole/l. | Al/V Ratio | Reaction Time, Min. | Copolymer Product | | | |
|---|---|---|---|---|---|---|---|---|---|
| | | | | | | G./l./hr. | G./mmole V | RSV | Mole percent C₃ |
| 3 | Al(C₂H₅)₂Cl | 0.59 | 0.39 | 1.5 | 60 | 37 | 47 | 4.1 | 31 |
| 4 | Al(C₂H₅)₂Cl | 2.4 | 0.24 | 10.0 | 76 | 33 | 173 | 3.3 | 27.5 |
| 5 | Al(C₂H₅)₂Cl | 4.68 | 0.158 | 30.0 | 78 | 26 | 212 | 2.4 | 28 |
| 6 | Ethyl Al Sesquichloride | 0.88 | 0.176 | 5.0 | 58 | 34 | 187 | 4.4 | 31 |

EXAMPLES 7-8

In these examples ethylene and propylene were copolymerized in a ½-gallon reactor equipped with a hollow shaft stirrer using one liter of a commercial heptane which was chiefly a mixture of paraffin and naphthenic hydrocarbons and had a boiling range of 94–99° C. as the diluent and saturated with a gas mixture containing 67 mole percent propylene and 33 mole percent ethylene under a pressure of 3 atmospheres in Example 7 and 2 atmospheres in Example 8. The copolymerization temperature was 45° C. The catalyst components were added continuously throughout the reaction, and the pressure was maintained constant by feeding a gas mixture containing 30 mole percent propylene on demand. The aluminum compound used was diethylaluminum chloride. The copolymerization was stopped and the copolymer isolated as described in Example 1. The reaction mixture was completely homogeneous in each case.

In Table II is set forth the amount of aluminum and vanadium compound used, the ratio of aluminum compound to vanadium compound, the reaction time, the amount of copolymer produced, its RSV and the mole percent of propylene as determined by infrared analysis.

The copolymer so obtained had an RSV of 3.0 and contained 37 mole percent of propylene. It was completely soluble in heptane at room temperature.

This copolymer was vulcanized using two recipes, A, the same as in Examples 7 and 8, and B as follows, and curing each for 45 minutes at 310° F.

RECIPE B 100 parts of copolymer
50 parts of high abrasion furnace black
4 parts of dicumyl peroxide
0.8 part of sulfur The physical properties for these vulcanizates were:

|  | A | B |
|---|---|---|
| Tensile strength, p.s.i. | 3,260 | 3,310 |
| Modulus 300% | 1,820 | 2,700 |
| Maximum Elongation, percent | 410 | 330 |
| Break Set, percent | 10 | 10 |
| Resilience, percent | 45 | 46 |
| Hardness, A2 | 60 | 66 |

Table II

| Example | Aluminum Compound | Mmole/l. | VOCl$_3$, mmole/l. | Al/V Ratio | Reaction Time, Min. | Copolymer Product ||||
|---|---|---|---|---|---|---|---|---|---|
|  |  |  |  |  |  | G./l./hr. | G./mmole V | RSV | Mole percent C$_3$ |
| 7 | Al(C$_2$H$_5$)$_2$Cl | 3.28 | 0.47 | 7.0 | 124 | 22 | 103 | 3.0 | 27 |
| 8 | Al(C$_2$H$_5$)$_2$Cl | 3.07 | 0.44 | 7.0 | 116 | 25 | 121 | 2.7 | 29 |

Each of the copolymers produced in Examples 7–8 were vulcanized using the following recipe and curing for 40 minutes at 310° F.:

100 parts of polymer
50 parts of high abrasion furnace black
4 parts of dicumyl peroxide
5 parts of paraffin oil (low aromatic)
2 parts of partially hydrogenated rosin
0.8 part of sulfur The following physical properties were found for each of these vulcanizates:

|  | Vulcanizate of— ||
|---|---|---|
|  | Ex. 7 | Ex. 8 |
| Tensile strength, p.s.i. | 3,550 | 3,250 |
| Modulus 300% | 1,540 | 1,570 |
| Maximum elongation, percent | 530 | 500 |
| Break set, percent | 20 | 10 |
| Resilience, percent | 40 | 45 |

EXAMPLE 9

Ethylene and propylene were copolymerized in a continuous run carried out in a 125-gallon reactor at 78 p.s.i.g. Commercial heptane (see Examples 3–6) containing the feed monomer in solution was fed at the rate of 15 gallons per hour. Separate streams of vanadium oxy trichloride and ethylaluminum sesquichloride dissolved in the same solvent were also fed to the reactor at the rate of 0.048 mole of vanadium oxy trichloride and 0.34 mole of ethylaluminum sesquichloride per hour. This was an Al/V ratio of 7.0. The monomer content of the liquid phase was continuously monitored, keeping the ethylene content between 8 and 10% of the total ethylene plus propylene. The temperature was maintained at 50–53° C. After a steady state had been reached, the copolymer was obtained at a rate of 150 lbs. per day.

This application is a continuation-in-part of our application Serial No. 796,262, filed March 2, 1959, now abandoned.

What we claim and desire to protect by Letters Patent is:

1. The process of copolymerizing ethylene with a linear 1-olefin which comprises passing ethylene and said olefin into an inert organic liquid solvent therefor and for the copolymer produced, at a temperature of from about 0° C. to about 150° C., in the presence of at least a catalytic amount of a catalyst dissolved in said solvent, varying the ratio of ethylene to said olefin fed to the reaction to maintain the ratio of ethylene to said olefin dissolved in the solvent constant throughout the copolymerization reaction and recovering as the total product of copolymerization a copolymer which is essentially homogeneous as to its composition and has a narrow molecular weight distribution, said catalyst being the catalyst formed on mixing in situ in the polymerization reaction mixture an aluminum compound selected from the group consisting of aluminum compounds having the formula R$_2$AlX where R is a hydrocarbon radical and X is halogen and alkylaluminum sesquihalides with a vanadium oxy trihalide, the latter being added continually throughout the copolymerization reaction.

2. The process of claim 1 wherein the linear 1-olefin copolymerized with the ethylene is propylene.

3. The process of claim 2 wherein the aluminum compound is a dialkylaluminum halide.

4. The process of claim 2 wherein the aluminum compound is an alkylaluminum sesquihalide.

5. The process of claim 2 wherein the vanadium compound is vanadium oxy trichloride.

6. The process of claim 3 wherein the catalyst is formed in situ continually throughout the copolymerization reaction by adding solutions of dialkylaluminum chloride and vanadium oxy trichloride continuously throughout the copolymerization reaction and maintaining the mole ratio of the aluminum compound to the vanadium compound in the reaction mixture within the range of from about 1 to about 10.

7. The process of claim 3 wherein the catalyst is formed in situ continually throughout the copolymerization reaction by adding solutions of dialkylaluminum chloride and vanadium oxy trichloride continuously throughout the copolymerization reaction and maintaining the mole ratio of the aluminum compound to the vanadium compound in the reaction mixture within the range of from about 10 to about 30.

8. The process of claim 1 wherein the vanadium oxy trihalide is added continuously throughout the copolymerization reaction.

9. The process of claim 1 wherein the vanadium oxy trihalide is added incrementally throughout the copolymerization reaction.

10. The process of claim 1 wherein the catalyst is formed in situ continually throughout the copolymerization reaction by adding solutions of the aluminum compound and the vanadium oxy trihalide continuously throughout the copolymerization reaction.

11. The process of copolymerizing ethylene with propylene which comprises passing ethylene and propylene, in proportions to produce a copolymer containing from about 25 to about 60 mole percent of propylene, into an inert organic liquid solvent therefor and for the polymer produced, at a temperature of from about 25° C. to about 80° C. at atmospheric pressure, in the presence of at least a catalytic amount of a catalyst dissolved in said solvent, varying the ratio of ethylene to propylene fed to the reaction so as to maintain the ratio of ethylene to propylene dissolved in the solvent constant throughout the copolymerization reaction and recovering as the total product of copolymerization an ethylene-propylene copolymer which is essentially homogeneous as to its composition and has a narrow molecular weight distribution, said catalyst being formed in situ in the polymerization reaction mixture by adding diethylaluminum chloride and vanadium oxy trichloride in an aluminum to vanadium mole ratio of from about 1 to about 500 separately and continuously throughout the reaction, at a rate of not more than about 2 millimoles of vanadium per liter per hour.

12. A method of copolymerizing ethylene with a linear 1-olefin which comprises passing ethylene and said 1-olefin into an inert organic liquid solvent therefor and for the copolymer produced, at a temperature of from about 0° C. to about 100° C., in the presence of at least a catalytic amount of a catalyst dissolved in said solvent, continuously adding ethylene and said 1-olefin at a ratio and rate such that the ratio of ethylene to 1-olefin units in the copolymer formed is maintained substantially constant throughout the copolymerization reaction, said catalyst being the catalyst formed on mixing in situ in the polymerization reaction mixture an aluminum dialkyl halide and a vanadium oxytrihalide, said aluminum dialkyl halide and vanadium oxytrihalide being added continuously throughout the copolymerization reaction.

References Cited by the Examiner

UNITED STATES PATENTS

| 2,962,451 | 11/60 | Schreyer | 260—93.7 |
| 2,993,036 | 7/61 | Thomka et al. | 260—93.7 |

FOREIGN PATENTS

| 538,782 | 12/55 | Belgium. |
| 553,655 | 6/57 | Belgium. |
| 1,172,102 | 10/58 | France. |

OTHER REFERENCES

Billmeyer: Textbook of Polymer Chemistry (1957), Interscience Publishers Inc., New York, page 239.

JOSEPH L. SCHOFER, *Primary Examiner.*

L. H. GASTON, M. LIEBMAN, J. R. LIBERMAN,
*Examiners.*